(12) United States Patent
Son (10) Patent No.: US 9,571,032 B2
(45) Date of Patent: Feb. 14, 2017

(54) JUNCTION BOX FOR SOLAR CELL MODULE AND METHOD FOR DRIVING SAME

(71) Applicant: Leto Solar Corporation, Hackensack, NJ (US)

(72) Inventor: Byeong Keon Son, Closter, NJ (US)

(73) Assignee: Leto Solar Corporation, Hackensack, NJ (US)

( * ) Notice: Subject to any disclaimer, the term of this patent is extended or adjusted under 35 U.S.C. 154(b) by 0 days.

(21) Appl. No.: 14/766,076

(22) PCT Filed: May 28, 2014

(86) PCT No.: PCT/KR2014/004718
§ 371 (c)(1),
(2) Date: Oct. 5, 2015

(87) PCT Pub. No.: WO2014/200207
PCT Pub. Date: Dec. 18, 2014

(65) Prior Publication Data
US 2016/0043693 A1    Feb. 11, 2016

(30) Foreign Application Priority Data
Jun. 10, 2013  (KR) .......................... 10-2013-0065724

(51) Int. Cl.
*H02S 40/34* (2014.01)
*G01R 31/40* (2014.01)
(52) U.S. Cl.
CPC .............. *H02S 40/34* (2014.12); *H02S 50/00* (2013.01)
(58) Field of Classification Search
None
See application file for complete search history.

(56) References Cited

U.S. PATENT DOCUMENTS

2008/0138045 A1 * 6/2008 Nonaka ................... G06F 21/10
                                                            386/259
2008/0147335 A1 * 6/2008 Adest ..................... G01D 4/004
                                                            702/64
(Continued)

FOREIGN PATENT DOCUMENTS

JP     2010-258332 A    11/2010
JP     2012-256184 A    12/2012
(Continued)

OTHER PUBLICATIONS

International Search Report for PCT/KR2014/004718 dated Sep. 15, 2014.

*Primary Examiner* — Rexford Barnie
*Assistant Examiner* — David Shiao
(74) *Attorney, Agent, or Firm* — Kim Winston LLP (57) ABSTRACT

The present invention relates to a junction box for a solar cell module which receives a command of a manager from the outside, controls the solar cell module, displays an operating state of the solar cell module, and implements an anti-theft function, a fire prevention function, etc. of the solar cell module, and a method for driving the same. The junction box for a solar cell module according to the present invention comprises: a relay installed between a solar cell module and a combiner for connecting the solar cell module and the combiner for blocking the connection therebetween according to a control signal transmitted from the outside; an RF communication module for signal-processing a data signal transmitted from the outside and extracting solar cell module information and a command of a manager; and a microprocessor for controlling an operation of the relay so that the relay connects the solar cell module and the combiner or blocks the connection therebetween according to the (Continued)

command of the manager extracted from the RF communication module.

18 Claims, 3 Drawing Sheets

(56) References Cited

U.S. PATENT DOCUMENTS

| | | | | |
|---|---|---|---|---|
| 2010/0139734 A1* | 6/2010 | Hadar | ............... | H01L 31/02021 136/244 |
| 2010/0283612 A1* | 11/2010 | Wong | ................. | G08B 13/1409 340/568.1 |
| 2010/0301991 A1* | 12/2010 | Sella | .................. | G08B 13/1409 340/3.1 |
| 2011/0241603 A1* | 10/2011 | Chang | ............... | H01L 31/02021 320/101 |
| 2011/0260866 A1* | 10/2011 | Avrutsky | .......... | H01L 31/02021 340/568.1 |
| 2012/0033392 A1* | 2/2012 | Golubovic | .............. | H02S 40/34 361/752 |
| 2012/0055529 A1* | 3/2012 | Hung | ................. | H01L 31/02021 136/244 |
| 2013/0009483 A1* | 1/2013 | Kawate | .................... | H02J 3/383 307/77 |
| 2013/0113302 A1* | 5/2013 | Jeong | ..................... | H02B 15/00 307/117 |
| 2013/0194706 A1* | 8/2013 | Har-Shai | .............. | H02H 1/0015 361/42 |
| 2014/0089243 A1* | 3/2014 | Oppenheimer | ......... | G06F 21/50 706/46 |

FOREIGN PATENT DOCUMENTS

| | | |
|---|---|---|
| KR | 2010-0136091 A | 12/2010 |
| KR | 10-1008707 B1 | 1/2011 |

* cited by examiner

JUNCTION BOX FOR SOLAR CELL MODULE AND METHOD FOR DRIVING SAME

CROSS-REFERENCE TO RELATED APPLICATIONS

This application is a U.S. national phase application under 35 U.S.C. §371 of International Application No. PCT/KR2014/004718 filed on May 28, 2014, which claims priority to Korean application No. 10-2013-0065724 filed Jun. 10, 2013 the entire disclosures of which are hereby incorporated by reference in their entirety.

TECHNICAL FIELD

The present invention relates to a junction box for a solar cell module and a method for driving the same, and more particularly, to a junction box for a solar cell module which receives a command of a manager from the outside, controls the solar cell module, displays an operating state of the solar cell module, and implements an anti-theft function, a fire prevention function and the like of the solar cell module, and a method for driving the same.

BACKGROUND ART

A solar cell is an element for generating electric power from solar energy using various photoelectric effect materials.

Such a solar cell generally generates a photoelectromotive force using a P-N junction semiconductor cell, multiple solar cells are connected in series/parallel to configure a solar cell module having a specific capacity, these modules are connected to configure an array, and the array is installed in a power generation area.

Figure 1:
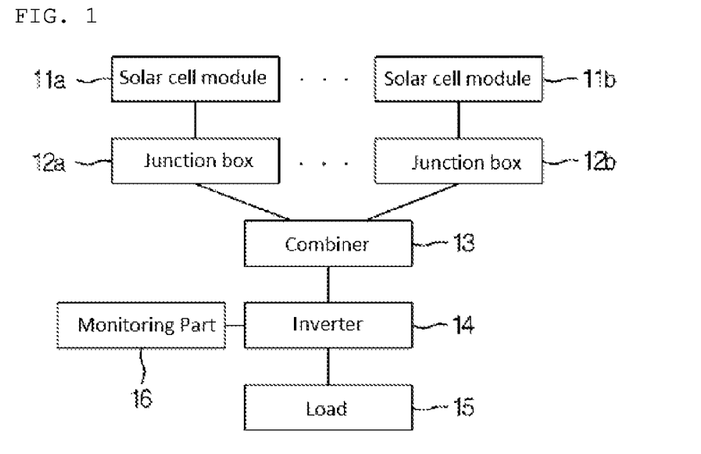
FIG. 1 is a schematic block diagram illustrating a general photovoltaic system.

FIG. 1 is a schematic diagram illustrating a general photovoltaic system.

The photovoltaic system includes: multiple solar modules 11a and 11b which produce DC current from solar energy; multiple junction boxes 12a and 12b, each of which is connected to one solar cell module; a combiner 13 which receives and combines the DC current outputted by the multiple solar cell modules 11a and 11b through the multiple junction boxes 12a and 12b; and an inverter 14 which converts the DC current generated by the combiner 13 to an AC power and provides the converted AC power to a load 15.

Such a photovoltaic system is further provided with equipment (ground relay, fuse switch, and the like) to operate the system in a safe way.

The junction boxes 12a, 12b are wired to provide the current generated by the solar cell modules 11a, 11b to the combiner 13, has a bypass element unit (bypass diodes) installed therein which allows electricity to bypass a certain solar cell module generating low power, or has a metallic heat sink to avoid overheating.

Meanwhile, in a conventional photovoltaic system, a monitoring part 16 for managing, controlling and monitoring the system is connected to an inverter 14 and therefore the process of the power produced by the multiple solar cell modules 11a, 11b, combined by the combiner 13 and then converted into a utility power by the inverter 14 may be managed, controlled and monitored.

However, the conventional photovoltaic system is not provided with any means for monitoring or controlling a fault or performance degradation of an individual solar cell module at all, and therefore the operating state of an individual solar cell module was unable to be monitored.

Further, even in the case where a fault of an individual solar cell module is sensed, it is unable to easily perform a fault management during the operation state when the multiple solar cell modules are continuously producing power, due to a risk of accident such as an electric shock or current leakage.

Furthermore, the photovoltaic system is typically installed outdoors, and thus involves a huge amount of expenses in the early installation stage. However, once the photovoltaic system is installed, it continuously produces electricity using solar energy to generate revenue.

This leads to a theft of the solar cell module for reuse since the conventional solar cell module may be compatibly reused with other photovoltaic systems, and such a theft of a solar cell module is a great obstacle to spreading the photovoltaic system.

DETAILED DESCRIPTION OF THE INVENTION

Technical Problem

Therefore, the present invention has been made to solve the problems of the related art, and it is an object of the present invention to provide a junction box for a solar cell module which monitors the operating state of a solar cell module and stores the monitored operating state, displays the operating state of the solar cell module by analyzing a signal received from the outside, controls power generation of the solar cell module, and prevents the stolen solar cell module from being reused in other photovoltaic systems, and also to provide a method for driving the junction box.

Technical Solution

In order to achieve the objects, the present invention provides a junction box for a solar cell module in a photovoltaic system which comprises a combiner and a monitoring part, the junction box being characterized by comprising: a relay for connecting the solar cell module and the combiner or cutting off the connection between the solar cell module and the combiner; an RF communication module for signal-processing a data signal transmitted from the outside and extracting at least one of solar cell module information and a command code; and a microprocessor for controlling an operation of the relay so that the relay connects the solar cell module and the combiner or cuts off the connection therebetween according to at least one of the solar cell module information and the command code which are extracted from the RF communication module.

Also, the present invention provides a method, in a photovoltaic system comprising a combiner and a monitoring part, for driving a junction box for a solar cell module which transmits a generated power of the solar cell module to the combiner, the method being characterized by comprising: signal-processing an RF signal transmitted from the outside and extracting at least one of a solar cell module information and a command code, by the junction box; and transmitting the generated power of the solar cell module to the combiner or cutting off the generated power of the solar cell module from being transmitted, according to at least one of the solar cell module information and the command code, by the junction box.

Effects of the Invention

According to the present invention, as described above, the operating state of each solar cell module can be monitored and displayed, and the generated power of each solar cell module can be cut off when required, so that an effective and safe management of the photovoltaic system can be achieved.

Further, it is advantageous to prevent a theft or smuggling of the solar cell in advance by preventing the solar cell module brought by theft or smuggling from being operated normally.

Moreover, it is advantageous to prevent a fire occurring from an overheated bypass diode by sensing an interior temperature of a junction box for a solar cell module and then cutting off the generated power of the solar cell module when the internal temperature exceeds a critical temperature.

EXPLANATIONS FOR REFERENCE NUMERALS 11a, 11b, 211: Solar cell module 12a, 12b, 200: Junction box
13, 213: Combiner 14: Inverter
212: RF communication module 214: Driving power supply part
215: Microprocessor 216: Memory
217: Display 222: Current sensing part
223: Voltage sensing part 224: Relay
225: Temperature sensor

BEST MODE FOR CARRYING OUT THE INVENTION

Hereinafter, a junction box for a solar cell module and a method for driving the same in accordance with the present invention will be described in more detail with reference to the accompanying drawings.

Figure 2:
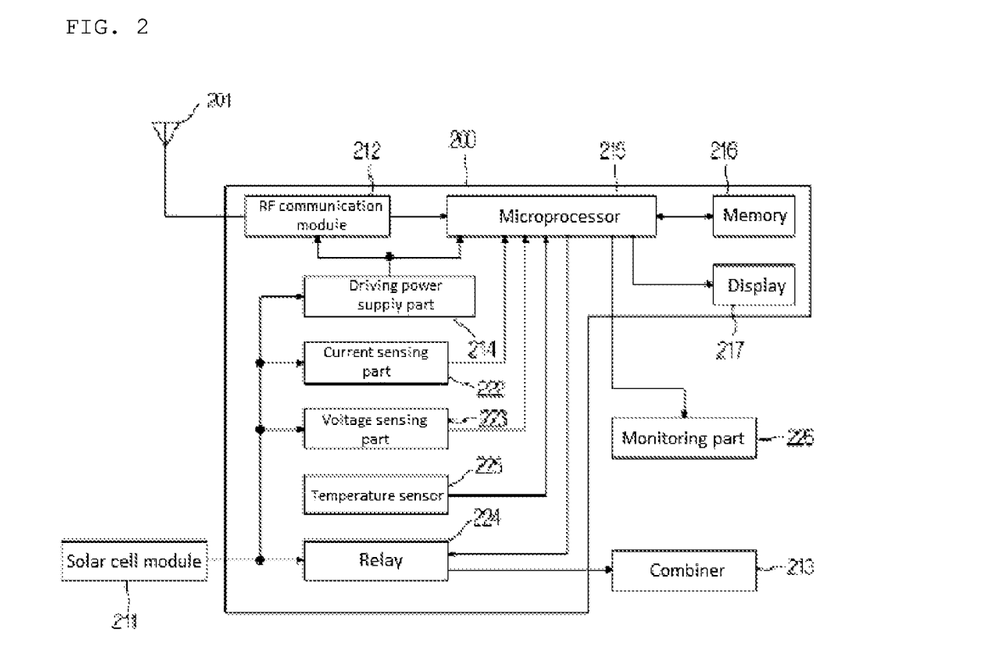
FIG. 2 is a block diagram illustrating an internal configuration of the junction box for the solar cell module in accordance with the present invention.

FIG. 2 is a block diagram illustrating an internal configuration of the junction box for the solar cell module in accordance with the present invention.

The junction box 200 for the solar cell module in accordance with the present invention includes; a relay 224 switched to transmit power generated from the solar cell module 211 to a combiner 213 or to cut off the generated power from being transmitted to the combiner 213; an RF module 212 for signal-processing a data signal transmitted through an antenna 201 from the outside to extract information of the solar cell module (for example, a country code assigned to the solar cell module, a installation site code assigned to the solar cell module) and a command of a manager (for example, a theft check period, a theft check reset date which is recently updated, a command code); and a microprocessor 215 for controlling the operation of the relay 224 according to the information of the solar cell module and the command of the manager extracted from the RF communication module 212.

The relay 224 is installed between the solar cell module 211 and the combiner 213, and is switched to connect the solar cell module 211 with the combiner 213 to allow the power generated by the solar cell module 211 to be transmitted to the combiner 213 or switched to cut off the connection between the solar cell module 211 and the combiner 213 to prevent the generated power from being transmitted to the combiner 213.

Accordingly, the power generated by the solar cell module 211 is supplied to the combiner 213 when the state of the solar cell module 211 is normal; however the power generated by the solar cell module 211 is not supplied to the combiner 213 when the state of the solar cell module 211 is abnormal (for example, in the case of a stolen solar cell module or a faulty solar cell module).

The RF communication module 212 modulates data transmitted from the microprocessor 215 into an RF signal, or demodulates the RF signal transmitted through an antenna 201 from the outside to extract a data signal included in the RF signal.

The RF communication module 212 is not different from well-known communication modules using an RF in configuration and functionality, and therefore a detailed description for the RF communication module will be ruled out.

The microprocessor 215 receives the information of the solar cell module and the command of the manager through the data transmitted from the RF communication module 212, and controls the operation of the relay 224 by the information of the solar cell module and the command of the manager.

Such an operation of the microprocessor 215 will be later described in detail.

Meanwhile, the junction box 200 for the solar cell module is configured to further include a driving power supply part 214 which receives the generated power from the solar cell module 211 and supplies a driving power to the RF communication module 212 and the microprocessor 215.

In this case, it is preferred that the driving power supply part 214 includes a charging circuit (not shown) configured to supply the driving power to the RF communication module 212 and the microprocessor 215 for a certain period of time even when the solar cell module 211 does not generate power.

Furthermore, the junction box 200 for the solar cell module is configured to further include a current sensing part 222 for sensing a generated current and a voltage sensing part 223 for sensing a generated voltage of the solar cell respectively, and the sensed value of the generated current sensed by the current sensing part 222 and the sensed value of the generated voltage sensed by the voltage sensing part 223 are transmitted to the microprocessor 215.

As a result, the microprocessor 215 periodically receives the sensed value of the generated current from the current sensing part 222 and the sensed value of the generated voltage from the voltage sensing part 223 respectively, and stores the sensed values in a memory 216. Then, the microprocessor compares the sensed value of the generated current from the current sensing part 222 and the sensed value of the generated voltage from the voltage sensing part 223, with the sensed values of the generated current and voltage which are cumulatively stored in the memory 216 for a predetermined period of time, and determines the operating state (e.g. normal, degradation or fault, etc.) of the solar cell module 211.

Meanwhile, the junction box 200 for the solar cell module may be configured to further include a display 217 for displaying the operating state of the solar cell module 211 and the connection or disconnection of the generated power, by the control of the microprocessor 215.

The microprocessor 215 controls the operation of the display 217 using the data extracted from the RF communication module 212 such that the operating state of the solar cell module 211 and the connection or disconnection of the generated power are displayed on the display 217.

The microprocessor 215 follows the command of the manager transmitted by the RF communication module 212 or controls the monitoring part 226 in such a way that the operating state information of the solar cell module 211 is displayed at the monitoring part 226 periodically.

At this time, the microprocessor 215 may control the output state of the monitoring part 226 through the power line communication (PLC).

The junction box 200 for the solar cell module may further include a temperature sensor 225 for measuring an internal temperature, and the internal temperature of the junction box 200 for the solar cell module measured by the temperature sensor 225 is transmitted to the microprocessor 215.

The microprocessor 215 controls the operation of the relay 224 to prevent the power generated by the solar cell module 211 from being transmitted to the combiner 213 when the temperature transmitted from the temperature sensor 225 exceeds a predetermined critical temperature (wherein the predetermined critical temperature is stored in the memory 216).

To this end, it is preferred that a bypass diode is installed between the relay 224 and the combiner 213.

Meanwhile, information such as multiple sensed values of generated current periodically sensed at the current sensing part 222, multiple sensed values of generated voltage periodically sensed at the voltage sensing part 223, a critical temperature of the inside of the junction box 200 for the solar cell module, a country code assigned to the solar cell module, an installation site code assigned to the solar cell module, multiple command codes and operation process corresponding to each of the command code, a theft check period, a theft check reset date recently updated, and the like are stored in the memory 216.

In the memory 216, the maximum value, minimum value and average value of the sensed value of the generated current sensed for a specific period of time can be stored, and the maximum critical value or minimum critical value of the generated current may also be stored. Likewise, the maximum value, minimum value and average value of the sensed value of the generated voltage sensed for a specific period of time can be stored in the memory 216, and the maximum critical value or minimum critical value of the generated voltage can also be stored in the memory. Herein, the maximum critical value and the minimum critical value of the generated current, and the maximum critical value and the minimum critical value of the generated voltage respectively represent the maximum and minimum values of current and voltage generated when power is generated by the solar cell module which is under a normal condition.

The country code is stored such that it is unable to be modified by an operator of the photovoltaic system. It is preferred that the installation site code is stored such that it is able to be set up, reset or deleted by the operator of the photovoltaic system.

The command code includes a theft check period set-up code, a theft check reset code, a installation site code change code, a solar cell module state check code, a generated power cut-off code and a generated power connection code and the like.

The operation of the junction box for the solar cell module having the above-described configuration in accordance with the present invention is described below.

When the sunlight is incident on the solar cell module 211, power is generated by the solar cell module 211. The power generated by the solar cell module 211 is supplied to not only a driving power supply part 214 but also the combiner 213 through a relay 224.

Herein, the driving power supply part 214 generates the driving power required by each of the components (such as an RF communication module 212 and a microprocessor 215) of the junction box 200 for the solar cell module by using the power generated by the solar cell module 211 and supplies the driving power to each component.

When power is generated by the solar cell module 211, the current sensing part 222 and the voltage sensing part 223 respectively sense the generated current and the generated voltage supplied from the solar cell module 211 to the relay 224, and provide the microprocessor 215 with the sensed value of the generated current and the sensed value of the generated voltage.

Herein, the microprocessor 215 accumulates the sensed values of the generated current and the sensed values of the generated voltage at every predetermined period set by the manager and stores the accumulated sensed values in the memory 216. The microprocessor 215 compares the sensed value of the generated current and the sensed value of the generated voltage received from the current sensing part 222 and the voltage sensing part 223, with the accumulated sensed values of the generated current (such as sensed values of the generated current accumulated for a certain month) or the accumulated sensed values of the generated voltage (such as sensed values of the generated voltage accumulated for a certain month) and determines whether the operation state of the solar cell module 211 is any one of normal, deteriorated or faulty states.

Also, the microprocessor 215 may determine whether the operation state of the solar cell module 211 is any one of normal, deteriorated or faulty states by comparing the sensed value of the generated current and the sensed value of the generated voltage received from the current sensing part 222 and the voltage sensing part 223, with the maximum or minimum critical value of the generated current or with the maximum or minimum critical value of the generated voltage. For example, the microprocessor 215 determines the operating state of the solar cell module 211 to be normal when the sensed value of the generated current and generated voltage which are respectively supplied from the current sensing part 222 and the voltage sensing part 223 range between the maximum critical value and the minimum critical value; determine the operating state of the solar cell module 211 to be deteriorated when the sensed values of the generated current and generated voltage are smaller than the minimum critical value; and determine the operating state of the solar cell module 211 to be faulty when any one of the sensed values of the generated current and generated voltage is not sensed or any one of each of the sensed values of the generated current and generated voltage exceeds the maximum critical value.

The microprocessor 215 controls the operation of the relay 224 to allow the power generated by the solar cell module 211 to be transmitted to the combiner 213 when the temperature sensed by the temperature sensor 225 exceeds the predetermined critical temperature (herein, the predetermined critical temperature is stored in the memory 216).

Meanwhile, when a data signal is transmitted from the outside through the antenna 201, the RF communication module 212 signal-processes the data signal transmitted though the antenna 201 to extract the data included in the data signal, and transmits the extracted data to the microprocessor 215.

Herein, the data extracted from the RF communication module 212 includes a country code of the solar cell module, an installation site code of the solar cell module, and a command code (i.e., a command of a manager).

Thus, the microprocessor 215 determines through comparison whether the country code of the solar cell module transmitted through the RF communication module 212 from the outside is identical to the country code of the solar cell module pre-stored in the memory 216, and determines through comparison whether the installation site code of the solar cell module transmitted through the RF communication module 212 from the outside is identical to the installation site code of the solar cell module pre-stored in the memory 216.

Herein, when the country code and the installation site code of the solar cell module transmitted through the RF communication module 212 are identical to the country code and the installation site code preset and pre-stored in the memory 216, the microprocessor 215 activates the relay 224 to transmit the generated power of the solar cell module 211 to the combiner. When any one of the country code and the installation site code is not identical, the microprocessor prevents the relay 224 from transmitting the generated power of the solar cell module 211 to the combiner 213.

Herein, the reason why the country code of the solar cell module transmitted through the RF communication module 212 is compared with the country code of the solar cell module preset and pre-stored in the memory 216 is that the price of the solar cell module 211 is differently set in each country and therefore an inexpensive solar cell module is smuggled from the EU or the US to other region (such as Japan) where the price is high.

Thus, in each country, a country code is assigned to a solar cell module in such a way that a manager is unable to manipulate the country code. If the country code of the solar cell module transmitted through the RF communication module 212 is different from the country code of the solar cell module preset and pre-stored in the memory 216, the relay 224 is cut off by the microprocessor 215 and therefore the stolen and smuggled solar cell module 211 becomes useless.

Further, when the country code of the solar cell module transmitted through the RF communication module 212 is identical to the country code of the solar cell module preset and pre-stored in the memory 216 but the installation site code of the solar cell module transmitted through the RF communication module 212 is different from (i.e., stolen and installed in a different location in the same country) the installation site code of the solar cell module preset and pre-stored in the memory 216, the relay 224 is cut off by the microcontroller 215 and therefore the stolen solar cell module 211 becomes useless.

That is, in the case where a solar cell module and a junction box typically form a single set, and the set is entirely stolen for trafficking or the set is stolen and installed at a different site rather than a due place where the solar cell module should be installed, the microprocessor 215 cuts off the relay 224 to prevent the generated power of the solar cell module 211 from being transmitted to the combiner 213, and therefore the solar cell module (i.e. a solar cell module forming a single set together with a junction box) which has been either stolen or stolen and trafficked becomes useless.

Meanwhile, when a command code received through the RF communication module 212 is an installation site code change code, the microprocessor 215 changes the installation site code of the corresponding solar cell module stored in the memory 216 to a new installation site code which is newly inputted.

Herein, 'change' may also include an initial set-up. The installation site code is an arbitrary code assigned to each of the photovoltaic equipment which is installed and controlled by a manager (for example, an individual or an enterprise authorized to use solar cell modules and junction boxes (i.e. solar energy company).

Furthermore, when a command code received through the RF communication module 212 is a theft check period set-up code, the microprocessor 215 changes the theft check period stored in the memory 216 to a new theft check period which is newly inputted.

Herein, 'change' may also comprise an initial set-up. The theft check period is a period during which a theft check reset should be inputted.

When the theft check period is elapsed from the theft check reset date which is recently updated, the microprocessor 215 cuts off the relay 224 to prevent the generated power of the solar cell module 211 from being provided to the combiner 213.

Meanwhile, when a command code received through the RF communication module 212 is a theft check reset code, the microprocessor 215 changes the corresponding date to the recent theft check reset date and stores the changed theft check reset date in the memory 216.

Thus, when the stolen solar cell module 211 is installed in a solar power plant, a theft check reset code is not inputted after the theft check period has been passed by, and therefore the microprocessor 215 cuts off the relay 224 to prevent the generated power of the solar cell module 211 from being provided to the combiner 213.

That is, the stolen solar cell module 211 becomes useless.

When a command code received through the RF communication module 212 is a solar cell module state check code, the microprocessor 215 determines if the state of the solar cell module is normal, deteriorated or faulty on the basis of the sensed values of the generated voltage and the sensed values of the generated current which are accumulated for a specific period of time, and then the microcontroller controls the display 217 to display the determined information on the display 217. The microprocessor 215 may output the operating state of the solar cell module 211 to the outside via a separate port.

Meanwhile, when a generated power cut off code is received through the RF communication module 212 while the generated power of the solar cell module 211 is being provided to the combiner 213 through the relay 224, the microprocessor 215 switches the relay 224 to cut off the connection between the solar cell module 211 and the combiner 213 in order that the generated power of the solar cell module 211 is not provided to the combiner 213.

When a generated power connection code is received through the RF communication module 212 while the generated power of the solar cell module 211 is not provided to the combiner 213 (i.e. while the relay 224 cuts off the connection between the solar cell module 211 and the combiner 213), the microprocessor 215 switches the relay 224 to connect the solar cell module 211 with the combiner 213 in order that the generated power of the solar cell module 211 is provided to the combiner 213.

MODE FOR CARRYING OUT THE INVENTION

As such, the junction box 200 for a solar cell module in accordance with the present invention may provide not only a typical function of providing the power generated by the solar cell module 211 to the combiner 213 but also other functions of monitoring the power generated by the solar cell module 211; displaying the operation state of the solar cell module 211; cutting off or supplying the generated power of the solar cell module 211 by a manager; anti-theft of the solar cell module 211; preventing international smuggling; and preventing the outbreak of fire.

The operation of the microprocessor to realize the above functions is described below.

Figure 3:
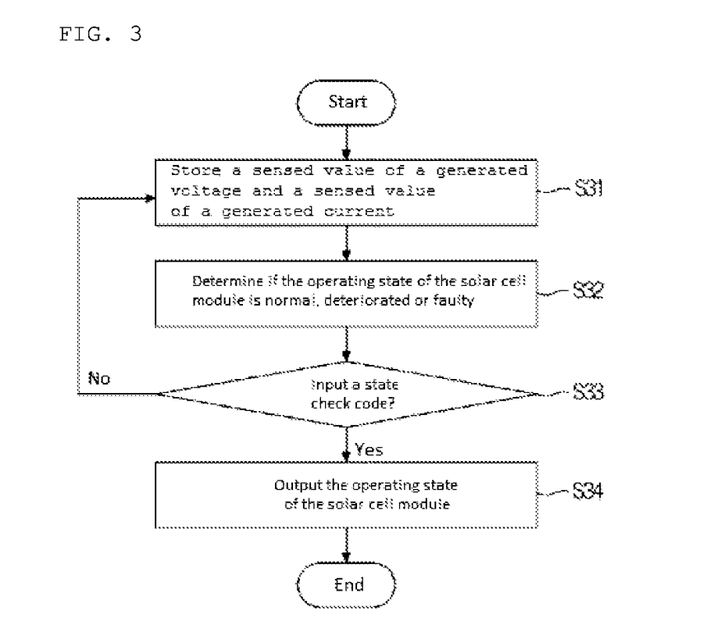
FIG. 3 is an operation flow chart illustrating how a microprocessor monitors a generated power of the solar cell module and displays a state of the solar cell module.

FIG. 3 is an operation flow chart illustrating how a microprocessor in accordance with the present invention monitors the generated power of a solar cell module and displays the operating state of the solar cell module.

The microprocessor 215 stores, in a memory 216, a sensed value of generated current sensed by the current sensing part 222 and a sensed value of generated voltage sensed by the voltage sensing part (S31).

The maximum value, minimum value and average value for each specific period (e.g., day, week, month, etc.) may be stored in the memory 216, or the maximum critical value and minimum critical value of the generated current of each of the solar cell module and the maximum critical value and minimum critical value of the generated voltage of each of the solar cell module may be stored in the memory 216. It is preferred that the maximum value of generated power, the minimum value of generated power and the average value of generated power for each day, week or month are stored in the memory when the maximum value, the minimum value and the average value for each specific period are calculated and stored.

Accordingly, the microprocessor 215 compares the sensed values of the generated current and generated voltage received from the current sensing part 222 and the voltage sensing part with the maximum critical value and minimum critical value of generated current (or generated voltage) of each of the solar cell modules, or the microprocessor compares the sensed values of the generated current and generated voltage received from the current sensing part 222 and voltage sensing part with the maximum, minimum and average value for each day, week or month stored in the memory 216 and determines if the operating state of solar cell module is normal, deteriorated or faulty (S32).

When a solar cell module state check code is transmitted through the RF communication module to the microprocessor 215 (S33), the microprocessor 215 provides the display 217 or the monitoring part 226 with the operating state information of the solar cell module that was determined in step S32, and the display 217 and the monitoring part 226 display the operating state information of the solar cell module 211 transmitted by the microprocessor (S34).

Figure 4:
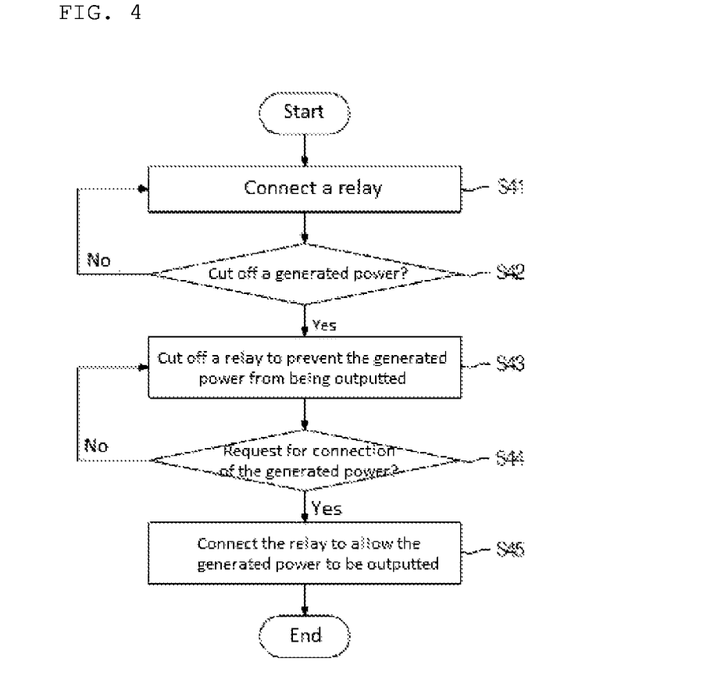
FIG. 4 is an operation flow chart illustrating how a microprocessor cuts off or connects the generated power of a solar cell module according to a manager's request.

FIG. 4 is a operation flow chart illustrating how a microprocessor in accordance with the present invention cuts off or connects the generated power of a solar cell module according to a manager's request.

When a generated power cut off code is transmitted to the microprocessor 215 through the RF communication module 212 in a state (S41) where the relay 224 connects between the solar cell module 211 and the combiner 213 to allow the generated power of the solar cell module 211 to be transmitted to the combiner 213, the microprocessor 215 switches the relay 224 to cut off the connection between the solar cell module 211 and the combiner 213 to prevent the generated power of the solar cell module 211 from being transmitted to the combiner 213 (S43).

Meanwhile, when a generated power connection code is transmitted to the microprocessor 215 through the RF communication module 212 (S44) in a state where the relay 224 cuts off the connection between the solar cell module 211 and the combiner 213 to prevent the generated power of the solar cell module 211 from being transmitted to the combiner 213, the microprocessor 215 switches the relay 224 to connect between the solar cell module 211 and the combiner 213 to allow the generated power of the solar cell module 211 to be transmitted to the combiner 213 (S45).

Figure 5:
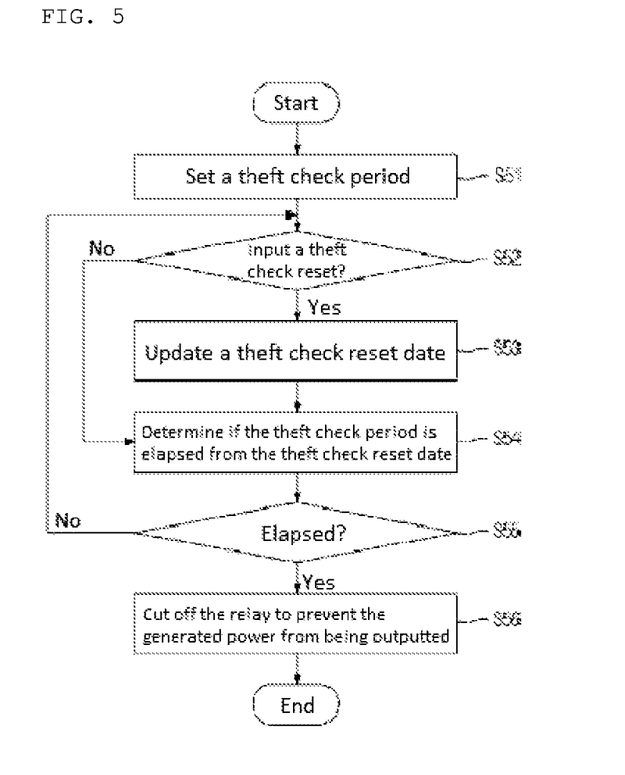
FIG. 5 is an operation flow chart illustrating how a microprocessor prevents the solar cell module from being stolen.

FIG. 5 is an operation flow chart illustrating how the microprocessor in accordance with the present invention prevents a solar cell module from being stolen.

When a theft check period set-up code is received through the RF communication module 212, the microprocessor 215 sets a theft check period (e.g., one month, 3 months, 6 months, etc.) and stores the set theft check period in the memory 216 (S51).

When a theft check reset code is received through the RF communication module 212 (S52), the microprocessor 215 updates the theft check reset date stored in the memory 216 (S53).

Thereafter, the microprocessor 215 determines if the theft check period is outdated using the theft check reset date stored in the memory (S54). Then, if the theft check is outdated (S55), the microprocessor switches the relay 224 (S56) to cut off the connection between the solar cell module 211 and the combiner 213 to prevent the generated power of the solar cell module 211 from being transmitted to the combiner 213.

That is, the microprocessor determines if a theft check reset code is inputted within a theft check period from the previous theft check reset. If the theft check reset code is periodically inputted, the microprocessor controls the relay 224 to allow the generated power of the solar cell module 211 to be normally transmitted to the combiner 213; in contrast, if the theft check reset code is not inputted until the theft check period is passed, the microcontroller switches the relay 225 to cut off the connection between the solar cell module 211 and the combiner 213 to prevent the generated power of the solar cell module from being transmitted to the combiner 213.

Thus, the solar cell module 211 with an outdated theft check period cannot transmit the generated power to the combiner 213 and therefore becomes useless.

Accordingly, there is an anti-theft effect since a stolen solar cell module is unable to perform photovoltaic power generation in any other solar power plant in which the solar cell module is reinstalled except for the original solar power plant so that the solar cell becomes useless.

Meanwhile, as shown in FIGS. 3 to 5, the microprocessor 215 compares a country code of a solar cell module transmitted together with a command code (a state check code of a solar cell module, a generated power cut off code, a generated power connection code, theft check set-up code, a theft check reset code and the like) with a country code of a solar cell module stored in the memory 216, and if both of the country codes are not identical to each other, the microprocessor switches the relay 224 to cut off the connection between the solar cell module 211 and the combiner 213 to prevent the generated power of the solar cell module 211 from being transmitted to the combiner 213.

Further, the microprocessor 215 compares an installation site code of a solar cell module transmitted together with a command code, with a installation site code of a solar cell module stored in the memory 216, and if the both of the installation site codes are not identical to each other, the microprocessor switches the relay 224 to cut off the connection between the solar cell module 211 and the combiner 213 to prevent the generated power of the solar cell module 211 from being transmitted to the combiner 213.

Figure 6:
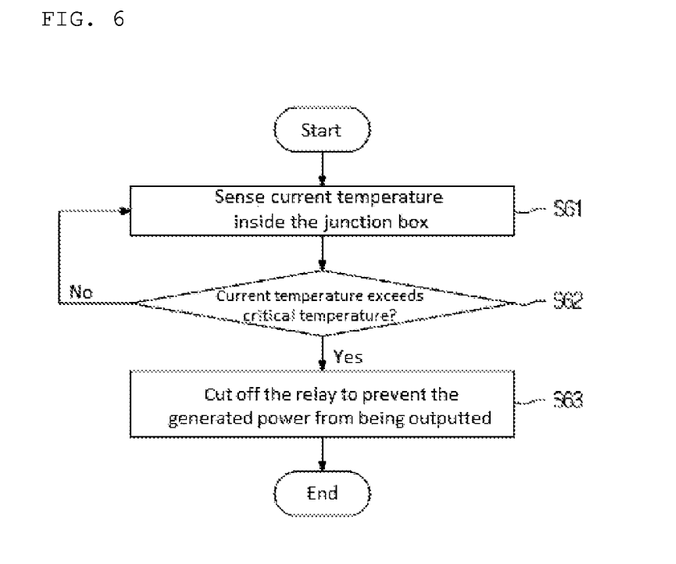
FIG. 6 is an operation flow chart illustrating how a microprocessor prevents the outbreak of fire.

FIG. 6 is an operation flow chart illustrating how the microprocessor in accordance with the present invention prevents the outbreak of fire.

The temperature sensor 225 senses an internal temperature of a junction box 200 for solar cell module (S61) and transmits the sensed internal temperature to the microprocessor 215.

The microprocessor 215 compares the temperature information received from the temperature sensor 225 with a critical temperature stored in the memory 216, and if the temperature information of the junction box received from the temperature sensor 226 exceeds the critical temperature (S62), the microprocessor switches the relay 224 to cut off the connection between the solar cell module 211 and the combiner 213 to prevent the generated power of the solar cell module 211 from being transmitted to the combiner 213 (S63).

In general, there exists a risk of the outbreak of fire due to an overheated bypass diode inside a junction box for a solar cell module; the relay 224, however, is cut off when the internal temperature of the junction box for the solar cell module is out of a normal range and exceeds a critical temperature so that the power applied to the bypass diode is accordingly cut off and therefore a fire can be prevented in advance.

While the spirit of the present invention has been described with reference to the accompanying drawings, the invention may, however, be embodied in many different forms and should not be construed as being limited to the embodiments set forth herein; rather, these embodiments are provided so that this disclosure will be thorough and complete, and will fully convey the concept of the invention to those skilled in the art.

The invention claimed is:

1. A junction box for a solar cell module in a photovoltaic system which comprises a combiner and a monitoring part, the junction box comprising:
   a relay for connecting the solar cell module and the combiner or cutting off the connection between the solar cell module and the combiner;
   an RF communication module for signal-processing a data signal transmitted from the outside and extracting a command code;
   a microprocessor for controlling an operation of the relay so that the relay connects the solar cell module and the combiner or cuts off the connection therebetween according to the command code which is extracted from the RF communication module; and
   a memory for storing a theft check period and a theft check reset date by a control of the microprocessor,
   wherein the theft check period is a period during which the theft check reset is inputted, and wherein the microprocessor updates the theft check reset date when the command code is a theft check reset input, and controls the relay to cut off the connection between the solar cell module and the combiner when the theft check period is elapsed from the theft check reset date without the RF communication module extracting a command code that is a theft check reset input.

2. The junction box of claim 1, wherein the RF communication module further extracts solar cell module information, and further comprising a memory for storing a country code assigned to the solar cell module by a control of the microprocessor, wherein the microprocessor controls the relay to cut off the connection between the solar cell module and the combiner when the country code included in the solar cell module information is different from the country code stored in the memory.

3. The junction box of claim 1, wherein the RF communication module further extracts solar cell module information, and further comprising a memory for storing an installation site code assigned to the solar cell module by a control of the microprocessor, wherein the microprocessor controls the relay to cut off the connection between the solar cell module and the combiner when the installation site code included in the solar cell module information is different from the installation site code stored in the memory.

4. The junction box of claim 1, further comprising a current sensing part for sensing a generated current of the solar cell module provided to the combiner through the relay and providing the generated current to the microprocessor, wherein the microprocessor records, in the memory, the sensed value of the generated current inputted from the current sensing part, and determines the operating state of the solar cell module by the sensed value of the generated current recorded in a memory of the junction box.

5. The junction box of claim 4, further comprising a display for displaying the operating state of the solar cell module by a control of the microprocessor.

6. The junction box of claim 4, wherein the microprocessor outputs the operating state information of the solar cell module to the monitoring part.

7. The junction box of claim 1, further comprising a voltage sensing part for sensing a generated voltage of the solar cell module provided to the combiner through the relay and providing the generated voltage to the microprocessor, wherein the microprocessor records the sensed value of the generated voltage inputted from the voltage sensing part in the memory, and determines the operating state of the solar cell module by the sensed value of the generated voltage recorded in a memory of the junction box.

8. The junction box of claim 1, further comprising:
   a temperature sensor for sensing a current temperature and providing the sensed current temperature to the microprocessor; and
   a memory for storing a critical temperature,
   wherein the microprocessor controls the relay to cut off the connection between the solar cell module and the combiner when the current temperature exceeds the critical temperature.

9. The junction box of claim 1, further comprising a driving power supply part for generating a driving power from the generated power of the solar cell module and providing the generated driving power to the RF communication module and the microprocessor.

10. The junction box of claim 9, wherein the driving power supply part further comprises a charging circuit for supplying the driving power to the RF communication module and the microprocessor.

11. The junction box of claim 1, wherein the microprocessor controls the relay to cut off the connection between the solar cell module and the combiner when the command code is a generated power cut off code, and the microcontroller controls the relay to connect the solar cell module and the combiner when the command code is a generated power connection code.

12. A method, in a photovoltaic system comprising a combiner and a monitoring part, for driving a junction box for a solar cell module which transmits a generated power of the solar cell module to the combiner, the method comprising:
   a first step of signal-processing an RF signal transmitted from the outside and extracting a command code, by the junction box; and
   a second step of transmitting the generated power of the solar cell module to the combiner or cutting off the generated power of the solar cell module from being transmitted, according to the command code, by the junction box, wherein the junction box updates a theft check reset date which is stored in a memory of the junction box when the command code is a theft check reset input and a theft check period is not elapsed, and cuts off the connection between the solar cell module and the combiner when the theft check period is elapsed from the theft check reset date without the junction box extracting a command code that is a theft check reset input.

13. The method of claim 12, wherein the junction box further extracts a solar cell module information and allows the connection between the solar cell module and the combiner to be cut off when a country code included in the solar cell module information is different from a country code stored in a memory of the junction box.

14. The method of claim 12, wherein the junction box further extracts a solar cell module information and allows the connection between the solar cell module and the combiner to be cut off when an installation site code included in the solar cell module information is different from an installation site code stored in a memory of the junction box.

15. The method of claim 12, wherein the junction box records, in a memory, a sensed value of a generated current of the solar cell module provided to the combiner and determines the operating state of the solar cell module using the sensed value of the generated current recorded in the memory.

16. The method of claim 15, wherein the junction box displays the operating state of the solar cell module.

17. The method of claim 12, wherein the junction box records, in a memory, a sensed value of a generated voltage of the solar cell module provided to the combiner, and determines the operating state of the solar cell module using the sensed value of the generated voltage stored in the memory.

18. The method of claim 12, wherein the junction box allows the connection between the solar cell module and the combiner to be cut off when a current temperature sensed by a temperature sensor exceeds a critical temperature pre-stored in a memory of the junction box.

* * * * *